July 5, 1955  R. E. FOX  2,712,450
ANIMAL SIMULATED OCCUPANT PROPELLED VEHICLE
Filed Sept. 24, 1953  2 Sheets-Sheet 1
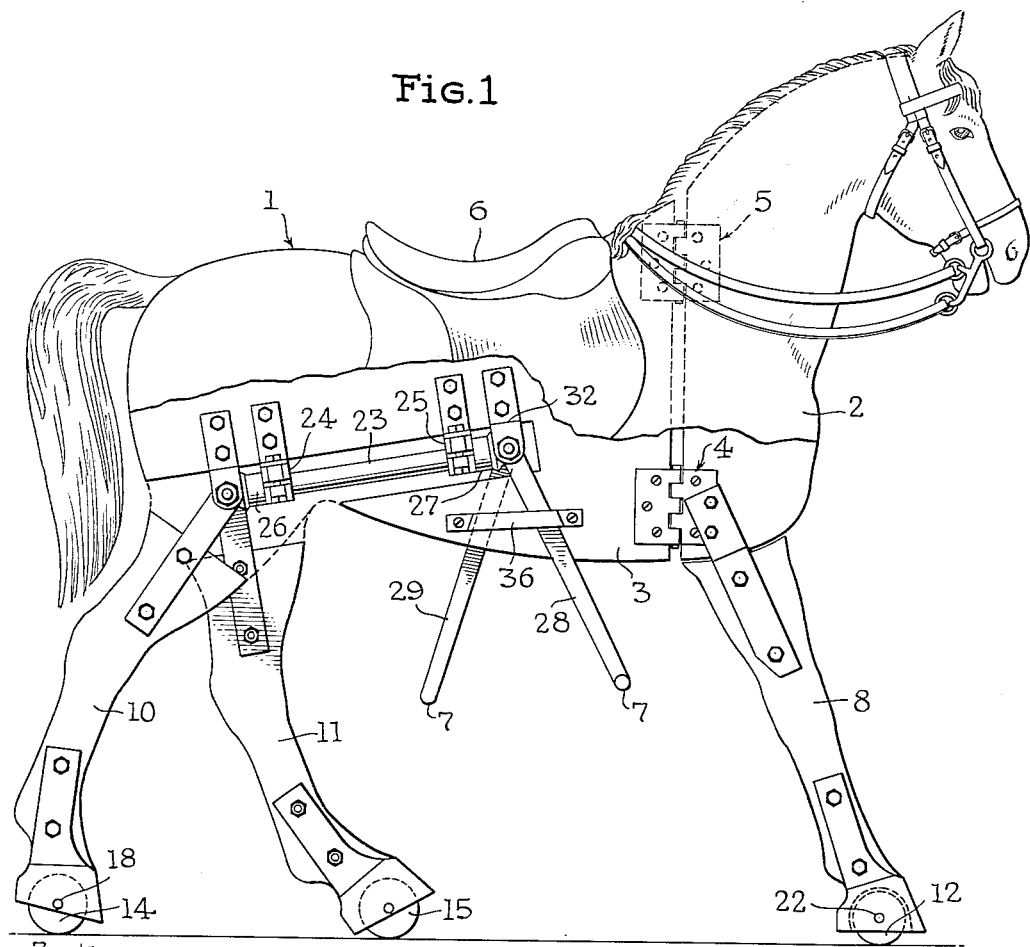
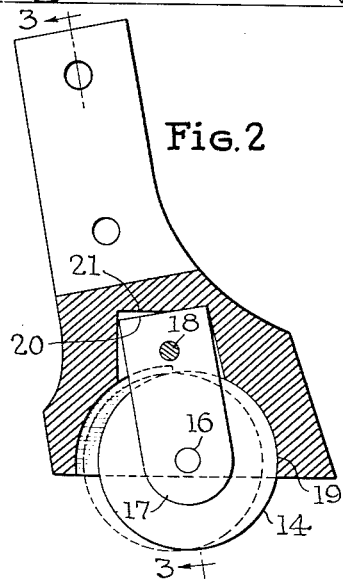
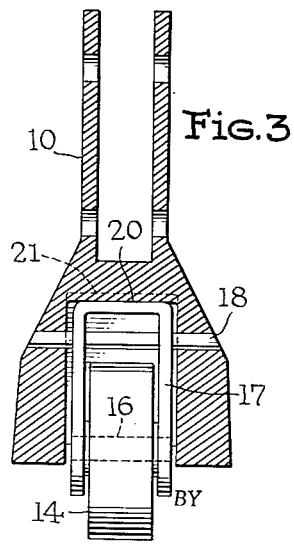
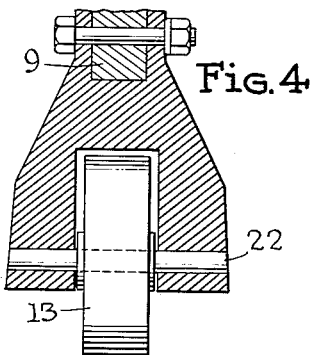
INVENTOR
Raymond E. Fox
ATTORNEY July 5, 1955 R. E. FOX 2,712,450
ANIMAL SIMULATED OCCUPANT PROPELLED VEHICLE
Filed Sept. 24, 1953 2 Sheets-Sheet 2
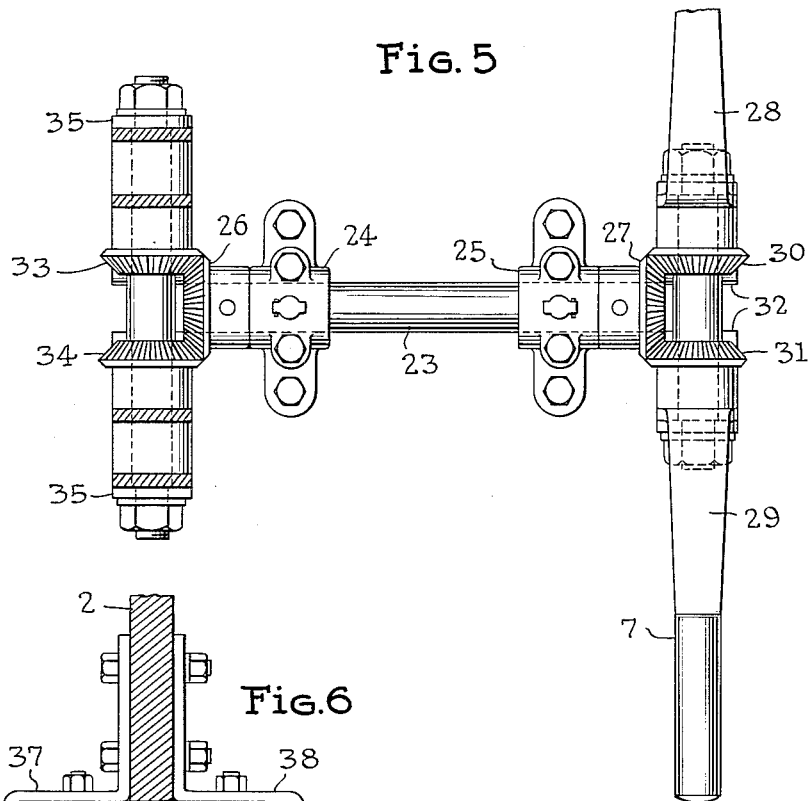
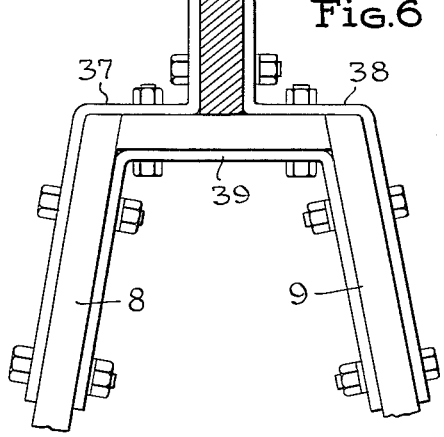
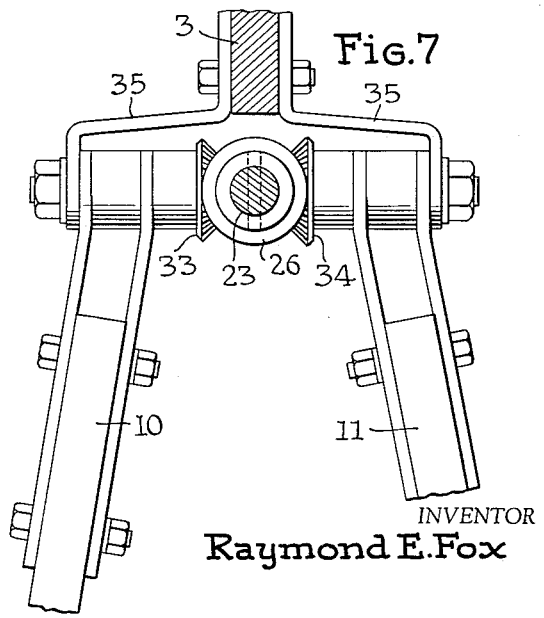
INVENTOR
Raymond E. Fox
BY
ATTORNEY

United States Patent Office 2,712,450
Patented July 5, 1955

2,712,450

ANIMAL SIMULATED OCCUPANT PROPELLED VEHICLE

Raymond E. Fox, Alexandria, Va.

Application September 24, 1953, Serial No. 382,082

3 Claims. (Cl. 280—1.181)

This invention relates to improvements in occupant propelled vehicles. More specifically, it relates to improvements in occupant propelled vehicles of the animal simulated type.

An object of this invention is to produce an animal simulated occupant propelled vehicle which is easily propelled by the occupant due to an improved driving means.

A further object of this invention is to provide a vehicle of this type that will be simple, extremely sturdy, and free from mechanical troubles.

Another object of this invention is to provide a novel driving mechanism for this type of vehicle.

Other objects and advantages of the invention will be apparent from the drawings and the following specification.

In the drawings:

Figure 1 is a side view partly in section of a preferred form of the invention;

Figure 2 is a side view partly in section of the rear driving rollers;

Figure 3 is a sectional view taken along the line 3—3 of Figure 2;

Figure 4 is a sectional detail view of the front supporting rollers;

Figure 5 is a plan view of the driving mechanism;

Figure 6 is a detail view of the attachment of the front supporting members to the body; and Figure 7 is a detail view of the attachment of the rear driving members to the driving mechanism and to the body.

In Figure 1 the body of the vehicle 1 is shown in a form which simulates that of a horse, although it could be any other animal or other object, such as an aeroplane, automobile, or locomotive. The front portion 2 of the body is pivotally connected in a vertical plane with the rear portion 3 of the body. Such connection may be as shown by the hinges 4 and 5, although there are obviously many known mechanical equivalents. The rear portion 3 has attached thereto a seat or saddle 6, the pedals 7, and the driving mechanism, which will be more fully described hereinafter.

The body is supported at the front by rigidly attached leg members 8 and 9. The rear portion is supported by leg members 10 and 11, each of which are pivotally mounted on the body as shown. Attached to the lower end of the front supporting members are wheels or rollers 12 and 13, and attached to the lower end of the rear supporting members are the wheels or rollers 14 and 15.

Figures 2 and 3 show in detail the mounting of one of the rear wheels or rollers 14. The wheel is mounted to rotate on a shaft 16 which in turn is carried by the U-shaped plate member 17. The latter is pivotally mounted on the leg 10 by means of a shaft 18. By this arrangement, when the rear supporting member 10 is moved rearwardly of the vehicle with the wheel 14 in ground engaging contact, the member 17 will pivot to the position shown in the drawing forcing the roller 14 into contact with the surface 19, thus effectively locking the wheel against rotation. When the rear supporting member 10 is moved forward, the plate member 17 is pivoted back to the position shown in dotted lines on the drawing, where the top edge 20 of the member 17 will contact the surface 21 and prevent further rearward motion of the member 17, thus allowing the roller to rotate freely. Such an arrangement of the rear wheels, together with means for pivotally swinging the rear legs, provides a one way driving motion for the vehicle.

Figure 4 illustrates a preferred means for mounting the roller 13 on the front leg member so it will be free to rotate on the shaft 22.

A preferred form of driving mechanism is illustrated in Figures 5 and 7. A drive shaft 23 is rotatably supported in the bearing blocks 24 and 25, the latter being rigidly attached to the body 3. Bevel gears 26 and 27 are suitably rigidly attached, e. g. by peening, to each end of the drive shaft 23. Pedal arms 28 and 29 are pivotally connected to the rear portion 3 of the body and bevel gears 30 and 31 are rigidly attached to the inner ends thereof. The pedal assembly is pivotally supported on the body by the hanger brackets 32. Motion is imparted to the rear leg members through the medium of the bevel gears 33 and 34 which are rigidly attached to the inner pivoted ends of the rear driving members. The rear driving means are pivotally supported on the body 3 by the brackets 35. Angular movement of the pedal arms 28 and 29 is limited to about 60° by the stop member 36, as shown in Figure 1, which precludes the possibility of over-movement of the legs.

Substantially the entire vehicle may be contoured with foam rubber or other suitable pliable material to closely simulate the form of an animal's body. In this case, the motion of the driving mechanism will impart some movement to the pliable material, which will simulate, e. g. the movements of the body of a horse.

Figure 6 illustrates a preferred means for attaching the front supporting members to the body by the strap members 37, 38, and 39.

Forward locomotion of the vehicle is accomplished by back and forth movement of the pedals 28 and 29 by the occupant. A swinging motion of approximately 60° will produce the required result. The pedal movement causes the bevel gears 30 and 31 to oscillate the drive shaft, which in turn oscillates the rear bevel gears 33 and 34 in a direction opposite to that of the front bevel gears 30 and 31. The swinging motion of the pedals is thus imparted to the rear driving leg members. One rear driving leg member always is moving rearward, while the other rear driving leg member is moving forward. One-way motion of the rollers 14 and 15 permits the rearward moving driving leg member to propel the vehicle forwardly. Steering or guiding is accomplished by pivoting the front part 2 of the body 1 through the hinges, with respect to the rear portion. This is accomplished in the illustrated embodiment by pulling on the horses reins, shown in Figure 1.

The preferred form of the invention has been shown and described. However, it is obvious that other forms may be used within the spirit of the invention and the scope of the appended claims.

I claim:

1. A horse simulating occupant propelled vehicle comprising: a body including a head portion and a rear portion; means pivotally connecting said head portion to said rear portion; reins connected to said head portion for steering the vehicle; a pair of front legs rigidly attached to said head portion; a pair of ground engaging wheels, one rotatably secured to the lower end of each of said front legs; a pair of rear legs, each pivotally mounted on said rear portion; a pair of pedal arms, one pivotally mounted on each side of said rear portion substantially equidistant from each end thereof; stirrup members secured to the lower end of each of said pedal arms; a first pair of bevel gears, one rigidly attached to the inner pivoted end of each of said pedal arms; a second pair of bevel gears, one rigidly attached to the inner pivoted end of each of said rear legs; a shaft revolubly mounted on said rear body portion and extending longitudinally thereof between said first and second pairs of bevel gears; a third pair of bevel gears, one rigidly attached to each end of said shaft to mesh with said first and second gear pairs, respectively; and means for locking said rear leg wheels against rotation only when said rear legs are moved rearwardly of said body with the wheels in ground engaging contact; whereby alternate swinging movement of said pedal arms causes corresponding alternate swinging movement of said rear legs to drive said vehicle in a forward direction.

2. A vehicle as defined by claim 1 in which the gear ratio between the pedal arms and the rear legs is one to one.

3. An occupant propelled vehicle comprising: a body including a forward portion and a rear portion; means pivotally connecting said body portions; steering means connected to said forward portion whereby it may be turned with respect to said rear portion; a pair of legs rigidly connected to said forward portion, each leg including a ground engaging wheel rotatably supported at its lower end; a second pair of legs pivotally connected to said rear portion, each leg including a ground engaging wheel rotatably supported at its lower end; depending pedal means pivotally connected to said rear portion; a first pair of bevel gears, one rigidly secured to each of the inner ends of the pedal pivots; a second pair of bevel gears, one rigidly secured to each of the inner ends of the rear leg pivots; a shaft rotatably mounted on said rear body portion and extending longitudinally thereof between said first and second bevel gear pairs; and a third pair of bevel gears, one secured to each end of said shaft to mesh with each of said first and second gear pairs, so that swinging movement of the pedal means produces corresponding alternate swinging movement of the rear legs about their respective pivot points; and means for locking the rear leg wheels against rotation during their backward movement to effect a forward drive of the vehicle.

References Cited in the file of this patent

UNITED STATES PATENTS

| 1,269,490 | Murray et al. | June 11, 1918 |
| 1,369,628 | Dahl | Feb. 22, 1921 |
| 1,819,029 | King et al. | Aug. 18, 1931 |

FOREIGN PATENTS

| 10,950 | Austria | Feb. 25, 1903 |
| 267,421 | Switzerland | June 16, 1950 |
| 641,815 | France | Apr. 23, 1928 |